March 24, 1942. H. U. HJERMSTAD ET AL 2,277,323
DRIVE MECHANISM AND SIGN ACTUATED THEREBY
Filed Aug. 2, 1940 4 Sheets-Sheet 3
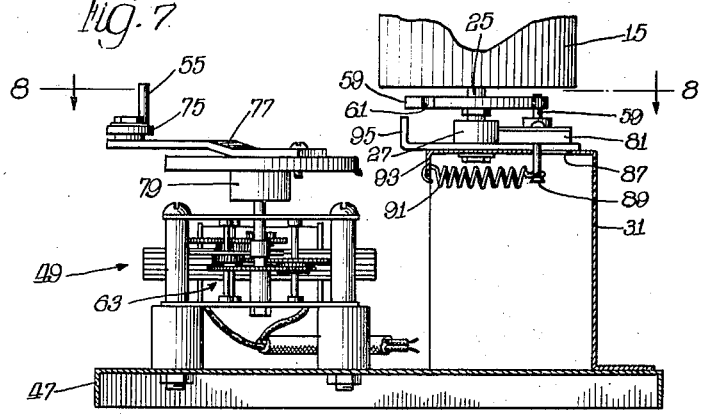
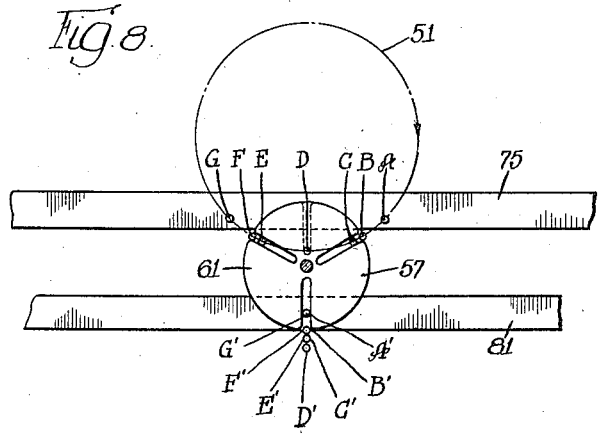
INVENTORS.
Hans U. Hjermstad,
Carl J. Kopp,
BY: Spencer, Marzall, Johnston & Cook
ATTYS.

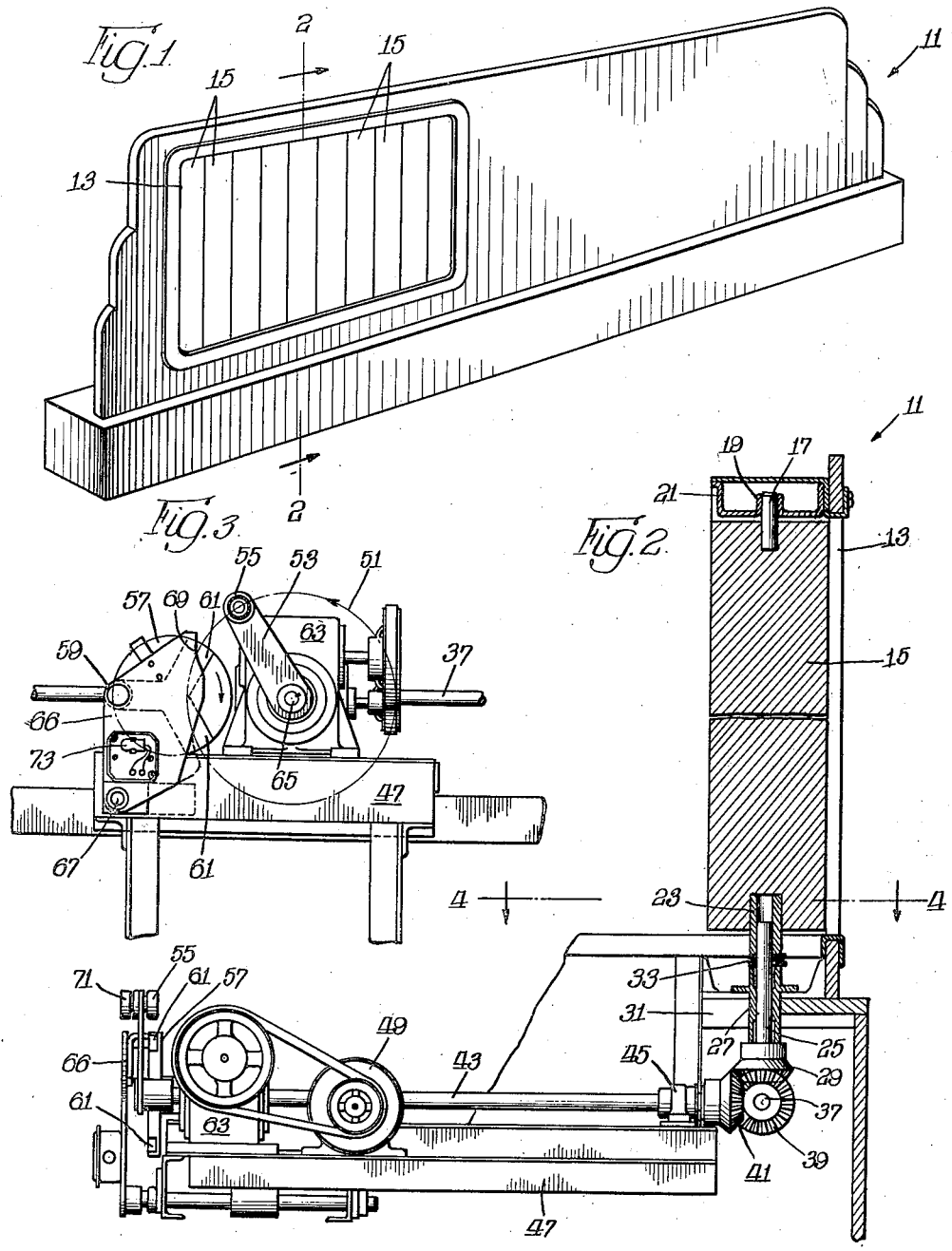

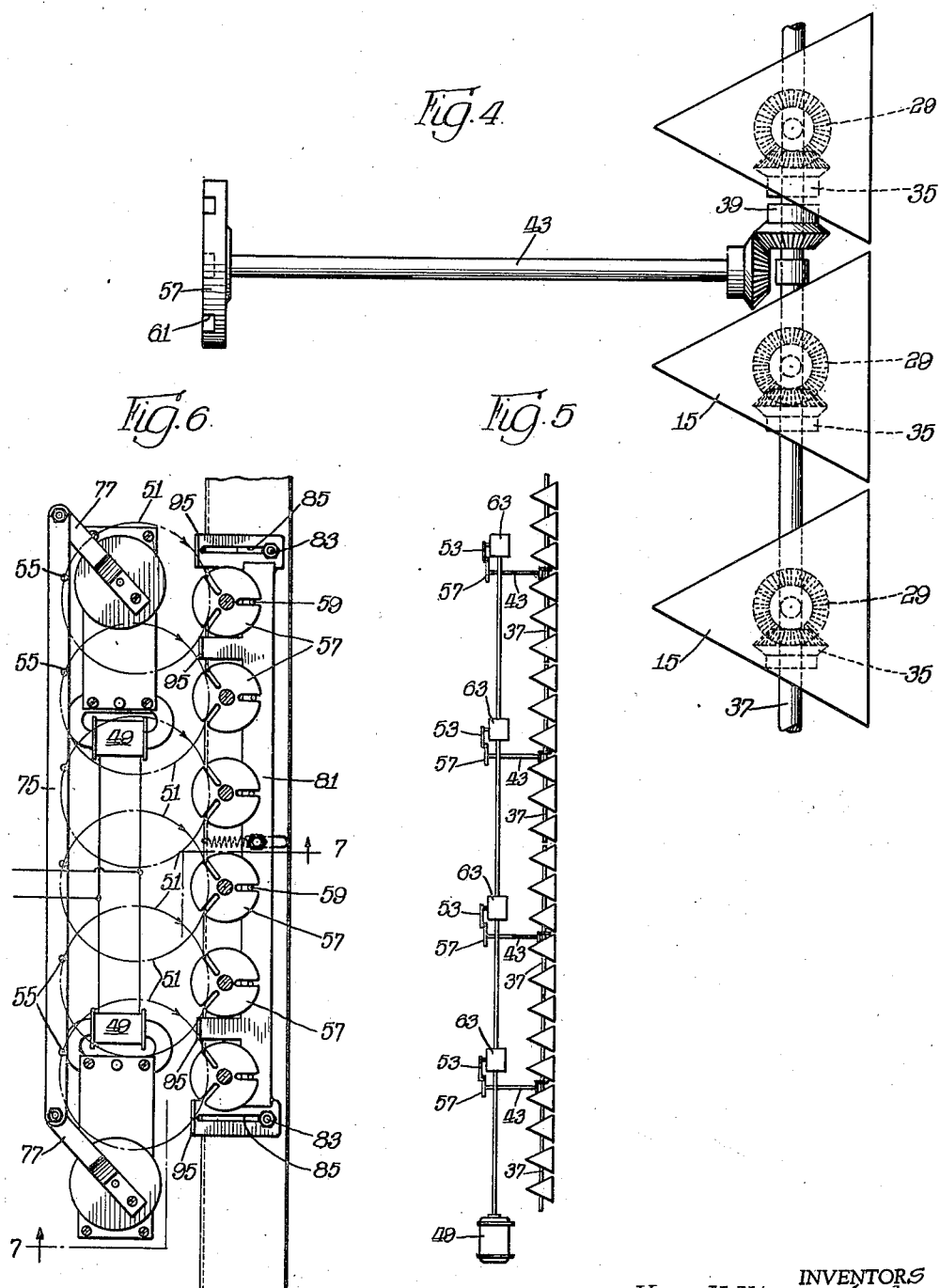

March 24, 1942.  H. U. HJERMSTAD ET AL  2,277,323
DRIVE MECHANISM AND SIGN ACTUATED THEREBY
Filed Aug. 2, 1940  4 Sheets-Sheet 4

INVENTORS
Hans U. Hjermstad,
Carl J. Kopp,
By Spencer, Marzall, Johnston & Cook.
Attys.

Patented Mar. 24, 1942

2,277,323

UNITED STATES PATENT OFFICE 2,277,323

DRIVE MECHANISM AND SIGN ACTUATED THEREBY

Hans U. Hjermstad and Carl J. Kopp, Chicago, Ill., assignors to Federal Electric Company, Inc., Chicago, Ill., a corporation of New York Application August 2, 1940, Serial No. 349,558

7 Claims. (Cl. 40—76)

Our invention relates in general to display devices and has more particular reference to change-sign devices wherein operable display mechanism is provided for successively presenting various different displays.

An important object of the present invention is to provide change-sign mechanism of simple, rugged character adapted for easy assembly; a further object being to utilize turnable members in adjacent relationship for carrying change-sign material on the surfaces thereof for display purposes; a still further object being to utilize elongated prismatic members having surfaces for receiving the display material thereon.

Another important object resides in providing improved means for turning elongated faceted display members for the purpose of successively presenting the faces thereof in a predetermined direction; a further object being to utilize a slotted driving disk on the turnable member in position to cammingly receive a driving pin for accomplishing turning movement.

Another important object resides in providing means for latching the faceted display member against turning movement when in one display position and for releasing the same to permit the turning thereof to another display position.

Another important object resides in providing improved driving means for progressively turning a rotatable element through a predetermined angle of rotation; a further object being to utilize a disk formed with circumferentially opening slots disposed in position therein subtending angles corresponding with the angular movement required in the turnable element; a still further object being to utilize, in combination with the slotted driving disk, a pin rotatable about a fixed center in position so that the pin may enter and leave radially extending slots formed in a driving disk, whereby to progressively turn the disk through angles corresponding with the spacement of the slots in the disk.

Another important object is to provide mechanism for simultaneously turning a plurality of adjacently mounted members through equal angles of rotation and to latch the members against turning movement during the interval between successive turning action, whereby surfaces of said members may be successively arranged to face a predetermined direction and thus present different display surfaces successively in display position.

These and numerous other important objects, advantages and inherent functions of the invention will become apparent as the same is more fully understood from the following description, which, taken in connection with the accompanying drawings, discloses preferred embodiments of the invention.

Referring to the drawings:

Figure 1 is a perspective view of a sign containing display mechanism embodying the present invention;

Figure 2 is a sectional view taken substantially along the line 2—2 in Figure 1;

Figure 3 is an elevation view of the mechanism shown in Figure 2;

Figure 4 is a sectional view taken substantially along the line 4—4 in Figure 2;

Figure 5 shows the invention diagrammatically as applied for driving a relatively large number of turnable elements;

Figure 6 is a sectional view illustrating a modified form of the invention, particularly well suited for driving small, light weight members;

Figure 7 is a sectional view taken substantially along the line 7—7 in Figure 6;

Figure 8 is a diagrammatic sectional view taken substantially along the line 8—8 in Figure 7;

Figure 9:
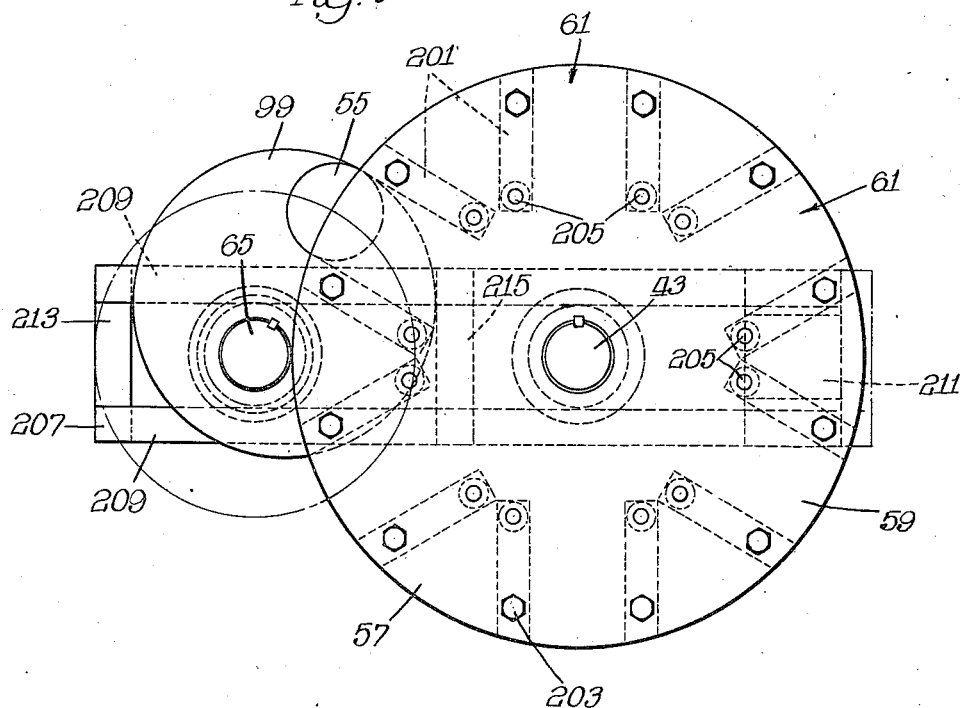
Figure 9 is a detail plan view of a modified form of operating or driving mechanism.

To illustrate the invention, we have shown on the drawings a sign 11 comprising a frame providing a display opening 13, in which sign-carrying means is disposed in position to be viewed through the opening from the front of the sign. The display means comprises a plurality of adjacent parallel members 15. These members comprise elongated prisms of triangular sectional configuration, being mounted in any suitable position, but which are shown vertical in the present embodiment. The members 15 are arranged in adjacent position in the opening 13 for turning movement on the axes of the prisms. By turning the prisms, the surfaces thereof may be successively presented in position facing through the opening 13, and it will be obvious that the aligned surfaces of all of the members 15 forms a composite surface on which a sign may be displayed. It is obvious also that each face of the member 15 may be utilized as a display surface when in alignment with corresponding faces of the other members, so that where triangular prisms are used, the assembly provides surfaces for three separate signs.

Each member 15 preferably comprises a prismatic body of triangular sectional configuration, which body may be formed of any suitable or preferred material, such as wood, or hollow sheet metal construction may be utilized. The members 15 may be pivoted by any suitable or preferred means in a frame which may form a part of the sign 11.

It will be understood that for change-sign purposes, it is desirable to turn the members 15 in unison through equal angles in order successively to align the several faces of the members 15 in displaying position, and to this end, all of the members 15 are driven from suitable motive means 49, which serves to drive cam pin means 55 in a circular path 51. The pin means 55 is adapted at intervals to drivingly engage cam following means 57 and move the same through a predetermined angular displacement. The cam follower means 57, being drivingly connected with the elements 15, cause the same to turn angularly, the resulting displacement of the display members 15 corresponding with the angular movement imparted to the follower means 57 by the pin means 55.

In order to latch the members 15 in display position, I provide latch pin means 59 in position to co-operate with the cam follower means 57 and latch the same against rotation, thereby latching the members 15 connected therewith against turning movement during the period when the pin means 55 is drivingly disengaged from the cam follower means 57. Means is provided, however, for releasing the latch means 59 by action of the driving means 55 just before the same enters driving engagement with the follower means 57, the latch controlling means being adapted to return the latch means to latching position as the driving means 55 passes away from driving relationship with the follower means 57.

The follower means 57 preferably comprises a disk drivingly connected with one or more of the members 15 and formed with preferably equally spaced, radially extending slots 61 opening at the peripheral edge of the disk at equally spaced points on the disk. The circular path 51, along which the cam means 55 is driven by the motor 49, has a radius such that the circular path of movement 51 is tangential with respect to the slots 61 at the edge of the disk 57. The disk 57 is also mounted in position spaced from the center of the path 51 such that two of the slots 61 are tangential with respect to the path 51, the disk being preferably latched in such position so that the cam pin 55, in traveling the path 51, may enter one of the slots 61 tangentially, the pin 55 simultaneously releasing the latch means 59, which conveniently may comprise a pin seating in another of the slots 61.

After entering a slot 61, continued movement of the pin 55 on the circular path 51 will cause the disk 57 to turn about its center due to the camming action of the pin 55 in the slot. During one-half of the turning movement imparted to the disk 57 as a result of the entry of the pin 55 in a slot 61, the pin 55 will move into the slot and will accelerate the disk 57 from a stationary position to maximum speed, which will occur when the disk reaches a position in which the slot 61, containing the pin 55, is in alignment with the center of rotation of the driving pin 55. Thereafter the continued movement of the pin 55 in the path 51 will result in the withdrawal of the pin from the slot 61 and, at the same time, turning movement of the disk 57 will be decelerated to standstill condition, which occurs as the pin leaves the slot. As the pin leaves the slot, the latching means 59 is released and permitted to enter one of the slots 61 in order to latch the disk 57 against rotation until the pin 55 again enters a tangentially disposed slot 61.

It will be seen from the foregoing that the pin 55 enters a slot 61, which is in position to receive the pin, thereby turning the disk 57 to arrange the slot in pin-releasing position, in which position another slot 61 will have been arranged in pin-receiving position, each slot thus successively operating to receive and release the driving pin and to receive and release the latch means 59. It will be noted also that the mechanism operates to accelerate turning movement during the initial stages of the operating cycle, the pin operating to decelerate or brake turning movement during the concluding stages of the operating cycle. This feature is of particular advantage where relatively heavy members are successively started and stopped. The arrangement insures smooth operation and does not require heavy duty braking mechanism such as is required where the driving mechanism merely serves to impart turning movement. In the present arrangement, the driving mechanism not only imparts turning movement but also serves as a brake, thereby conserving energy and insuring substantially vibrationless operation.

As shown more particularly in Figure 2 of the drawings, each member 15 is fitted at one end with a pin 17 extending in position to be turnably received in a journal 19 formed in a frame 21 which is secured on the sign preferably at the edge of the opening 13. The other end of the member 15 likewise is fitted with means for turnably supporting the same, and to this end, I have shown, in Figure 2 of the drawings, a sleeve-like member 23 fastened in the end of the member 15 in position to drivingly receive one end of a shaft 25 which extends in a bearing 27, the opposite end of the shaft 25 being fitted with a bevel gear 29. The bearing 27 is supported on a frame 31 which may be formed as a part of the sign 11, and I prefer to provide roller bearing means 33 interposed between the facing ends of the sleeve 23 and the bearing 27 in position to act as a step bearing to permit the supported member 15 to turn freely when driven by the shaft 25.

It will be understood from the foregoing that each of the members 15 will be similarly mounted for turning movement on the frames 21 and 31 and that each will be provided with a gear 29. The gears 29 each are drivingly engaged by corresponding bevel pinions 35 mounted on a countershaft 37 which also carries a driving gear 39 drivingly connected thereon. The gear 39, in turn, is drivingly engaged with a pinion 41 on a drive shaft 43 which is suitably journaled, as at 45, on a frame 47. The frame 47 may be supported on the sign structure 11 and carries motor means 49 which furnishes the power for turning the members 15. The motor 49 is drivingly connected to turn an arm 53 carrying the pin means 55 in the circular path 51. This, as shown in Figures 2 and 3, is accomplished by drivingly connecting the motor 49 with a suitable reduction gear 63 having a projecting shaft 65 on which the arm 53 is fastened. The cam follower disk 57 comprises a plate fastened on the shaft 43, the slots 61 being formed on the face of the plate.

In the embodiment illustrated in Figures 2 and 3, the latch means 59 comprises a roller mounted on a plate 66 which is pivoted, as at 67, on the frame 47. The plate 66 has a cam portion 69 extending in position to engage a roller 71 which is mounted on the arm 53, said roller serving to turn the plate 66 in a counter-clockwise direction, viewing Figure 3 of the drawings, as the cam member 55 enters the slot 61. Counter-clockwise movement of the plate 66 will cause the roller 59 to move out of latching position in the non-tangential slot 61 and thus release the disk 57 for rotation under the driving influence of the cam roller 55.

Ordinarily the motor means 49 will be in continuous operation under the control of a master switch, which may be either arranged for manual operation or for automatic operation under the control of a timing device. The switch 73 may be connected in parallel or shunt relationship with respect to the master control switch so that the motor 49, upon the opening of the master control switch, will continue in operation unless and until the mechanism reaches a latched position in which the driving cam 55 is out of engagement with the wheel member 57. This may be accomplished simply by arranging the switch 73 to be normally open when the plate 66 is in wheel latching position, the switch 73 closing and remaining closed so long as the latch 59 is in released position.

As shown in Figure 5, I have illustrated the application of the invention in installations comprising a relatively large number of elements 15 to be moved. In large installations, it is desirable to arrange the members 15 in groups, each group being driven by a separate counter-shaft 37. Each counter-shaft 37 is provided with its corresponding drive shaft 43, and each shaft 43 is fitted with a cam disk 57 having a corresponding arm 53 carrying a driving cam 55. Each of the arms 53 may be driven through a separate reduction gear 63, and all of the gears 63 may be powered from a single drive motor 49. In this fashion, the relatively heavy load, which otherwise might require an excessively heavy counter-shaft 37, is divided up so that each shaft 37 is not overloaded. The danger of delayed action, due to whip or twisting of the shaft in remote portions of an excessively long counter-shaft, is thus avoided.

As shown in Figures 6, 7 and 8, each member 15 may be fitted with a cam disk 57 which, as shown, may be secured directly on the spindle which rotatably carries the member 15. The driving means, in the embodiment shown in Figures 5, 6 and 7, comprises a bar 75 carrying cam means 55 in the form of driving pins spaced on the arm to correspond with the spacement of the axes of the members 15. The bar 75, at its opposite ends, is connected on arms 77 which are mounted for rotation in such a way that each of the pins 55 are caused to travel a circular path 51 having tangential relationship with two of the slots of the corresponding disk 57. Obviously any other expedient for causing the several pins 55 to travel similar paths 51 tangentially with respect to the slots in the disks 57 may be employed. In the illustrated embodiment, however, the arms 77 are mounted, as shown in Figure 7, on spindles 79 driven through suitable reduction gearing 63 by electric motors 49 powered from any suitable power source. The motors 49 preferably comprise induction motors powered from a common source of alternating current whereby the same are caused to operate in unison and at the same speed.

The latching means for securing the members 15 against rotation, as shown in Figures 6, 7 and 8, comprise spaced pins 59 mounted on a bar 81 which is slidingly supported on the frame 31 immediately below the disks 57, whereby the pins 59 are in position to enter the non-tangentially positioned slots of the disks 57. Sliding movement of the bar 81 is guided by pins 83 mounted on the frame 31 and extending in slots 85 formed in the bar, preferably at the opposite ends thereof. The frame 31 has an opening 87 beneath the bar 81 through which a pin 89 extends. This pin is fastened on the bar, preferably at its mid point, and forms an anchorage for one end of a spring 91, the other end of which is secured to a lug 93 which is formed on the frame 31, the spring operating normally to urge the bar 81 in a direction on the frame to cause the pins 89 to extend in latching position in the slots of the disks 57. The arm 81 has a plurality of fingers 95 which extend in position to be engaged by the edge of the bar 75 when the same is in position such that the cam pins 55 are about to enter the tangentially arranged slots of the disks 57 in order thus to move the bar 81 to a position unlatching the pins 59 from the non-tangential slots of the disks. After all of the disks have been turned by the cam action of the pins 55 in the active slots 61, the bar 75 is designed to release the fingers 95 and permit the bar 81 to return to latching position on the frame 31. The relative position of the driving and latching pins with respect to the slots in the disk 57 is illustrated graphically in Figure 8, wherein the letters A, B, C, D, E, F and G represent successive positions of the driving pin 55, while the letters A', B', C', D', E', F' and G' represent corresponding positions of the latching pin 59.

Figure 10:
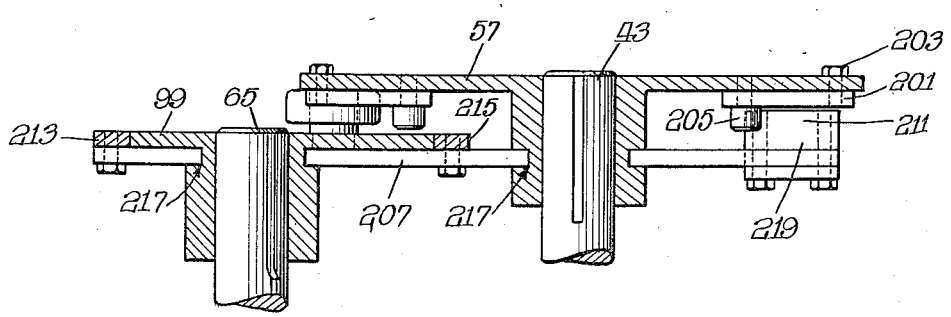
Figure 10 is a detail longitudinal sectional view of the structure shown in Figure 9.

In the embodiment illustrated in Figures 9 and 10, the driving cam 55 is mounted on the plate 99 which, in turn, is fast on the shaft 65. The cam following disk 57 is in the form of a flat plate and has the grooves 61 formed therein by means of spaced-apart parallel straps 201, as clearly shown in Figure 10. These straps 201 are secured to the under face of the disk 57 by means of flat headed screws 203 and other headed screws 205, Figure 10. The cam disk or plate 57 is splined or otherwise fast on the shaft 43, as indicated in Figure 10. The plate or disk 57 is latched or released by latch means 59, which comprises a frame or yoke 207 having spaced-apart longitudinal members 209. The members 209 are held in spaced relationship by means of cross members 211, 213 and 215, having their ends operatively connected to spaced longitudinal side members 209, Figure 9. The frame or yoke 207 is mounted for sliding movement on the hubs of the members 57 and 99 which are grooved, respectively, at 217, Figure 10, to receive slidingly the members 209 which extend on opposite sides of the said hubs. The cross members 213 and 215 engage opposite sides of the plate 99, which acts as a cam to move the frame 207 longitudinally. The frame cross piece 211 is cut out on one side, as indicated at 219, to slide upon and latchingly receive two of adjacent bolts 205 in order to secure the disk 57 against rotation when the frame is in the position determined by the disk 99 while the driving cam 55 is out of engagement with the slot 61. The slide is proportioned so as to release the heads of the latching bolts 205 as the cam member 55 enters a slot 61 to move the disk, the cam plate 57 remaining unlatched for turning movement so long as the driving cam 55 is in driving engagement in a slot 61.

It will be appreciated, of course, that when driving a three-sided sign with a driving cam formed with six slots, as shown in Figures 9 and 10, it is necessary to provide a two-to-one gear ratio between the shaft 43 and the counter-shaft 37 (Figure 4).

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, and a latch member movable radially with respect to said axis and adapted alternately to latch said follower against and release it for turning movement about said axis.

2. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, and a latch member movable radially with respect to said axis in position to enter each of the grooves when it is not, but when others are, tangentially positioned with respect to the circular path of the driving cam in order to latch the follower member against rotation.

3. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, a frame member reciprocable radially with respect to said axis, and co-operating latch means on the frame and follower members comprising a projection on one member and means forming a recess on the other to latchingly receive the projection when a pair of grooves of the follower member are tangentially positioned with respect to the circular path of the driving cam.

4. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, a frame member reciprocable radially with respect to said axis, and a finger on the frame in position to enter each of the grooves of the follower member when other of said grooves are tangentially positioned with respect to said circular path whereby to latch the follower member against rotation.

5. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, and a latch member movable radially with respect to said axis and adapted alternately to latch said follower against and release it for turning movement about said axis, said latch member being drivingly connected with and movable by said motor in timed relationship with the movement of the driving cam, whereby to release said follower member as the cam member enters a groove to turn the follower member and to latch with the follower member as the cam member leaves the groove after turning the follower member.

6. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, a latch member movable radially with respect to said axis and adapted alternately to latch said follower against and release it for turning movement about said axis, and an actuating member driven in a circular path by said motor in position to drivingly engage said latch member to impart simple harmonic motion thereto in releasing it from and re-latching it with said follower member.

7. The combination with a sign having a movable part and a driving motor, of means connecting the motor to move the part intermittently, comprising a driving cam movable in a circular path about a fixed center and drivingly connected with said motor, a follower member drivingly connected with said movable part and turnable about an axis spaced from the center of said path, said follower member having radial grooves for receiving said cam when the grooves are positioned tangential to the circular path of the cam, said grooves being equally spaced in the follower member with adjacent grooves subtending an angle at said axis such that both grooves of a pair of said grooves may simultaneously extend tangential with respect to the circular path of the driving cam, a latch member movable radially with respect to said axis and adapted alternately to latch said follower against and release it for turning movement about said axis, spring means normally urging the latch member toward latching position with respect to the follower member, and means operated by said motor in timed relation with the movement of the driving cam and operable to release said latch member from said follower member against the influence of said spring means while said cam member has driving engagement with the follower member in any of said grooves.

HANS U. HJERMSTAD.
CARL J. KOPP.